Sept. 3, 1957

D. McL. FROTHINGHAM 2,805,374

DATA CONVERSION SYSTEM

Filed Feb. 7, 1955

Sept. 3, 1957     D. McL. FROTHINGHAM     2,805,374

DATA CONVERSION SYSTEM

Filed Feb. 7, 1955     2 Sheets-Sheet 2

United States Patent Office 2,805,374
Patented Sept. 3, 1957

2,805,374

DATA CONVERSION SYSTEM

Donald McL. Frothingham, Darien, Conn., assignor, by mesne assignments, to Barnes Engineering Company, a corporation of Delaware Application February 7, 1955, Serial No. 486,561

7 Claims. (Cl. 318—33)

The present invention relates to digital-analog data converters and more particularly to a method and apparatus for slowing down such converter a predetermined interval before conversion is complete. This application is a continuation in part of my copending application Serial No. 364,098 filed June 25, 1953 entitled "Data Conversion System."

In my said copending patent application there is described a method and apparatus for translating electrical impulses in binary digital form into a corresponding angular disposition of a shaft. This is accomplished by providing, in association with the shaft, apparatus for producing binary digital electrical impulses representative of the instantaneous angular disposition of the shaft, apparatus for comparing the two sets of impulses and apparatus for rotating the shaft until the generated impulses match the supplied impulses. Since this method and apparatus can be and has been applied to the precise control of relatively ponderous apparatus such as a turret lathe, it will be evident that, in order to permit speedy operation, it is very helpful to slow down the shaft rotating motor just prior to achievement of the matched condition of the two sets of impulses, which condition causes the motor to stop. In this way overtravel can be virtually eliminated even when heavy equipment is being operated at high speed.

In accordance with the foregoing, the principal object of the invention has been to provide a method and apparatus for slowing down a shaft positioning apparatus operating by comparison of binary digital electrical impulses.

A feature of the invention has been to effect this slowing down when the shaft is at a predetermined angular disposition relative to the final angular disposition at which it is to stop.

Other and further objects, features and advantages of the invention will appear more fully from the following description.

In accordance with the invention, these objects are achieved by providing a data conversion system, comprising a rotatable element, a source of a first plurality of electrical impulses in unique combinations each representative, in binary digital impulse code, of a desired discrete angular disposition of the rotatable element, transducer means associated with the rotatable element for generating a second and like plurality of electrical impulses in unique combinations each representative, in like binary digital impulse code, of a discrete instantaneous angular disposition of the rotatable element, motor means for rotating the rotatable element at a predetermined speed, means for comparing sequentially and progressively the impulses constituting the digits of said codes, means operative when the compared impulses differ to operate the motor means in a sense to cause the impulse code generated by the transducer means to match the impulse code from the source, and means responsive to generation by the transducer of an impulse code differing from the impulse code from the source by a selected binary digit to cause the motor means to rotate said rotatable element at a speed lower than the predetermined speed.

The invention will now be described in greater detail with reference to the appended drawings in which.

Figure 1:
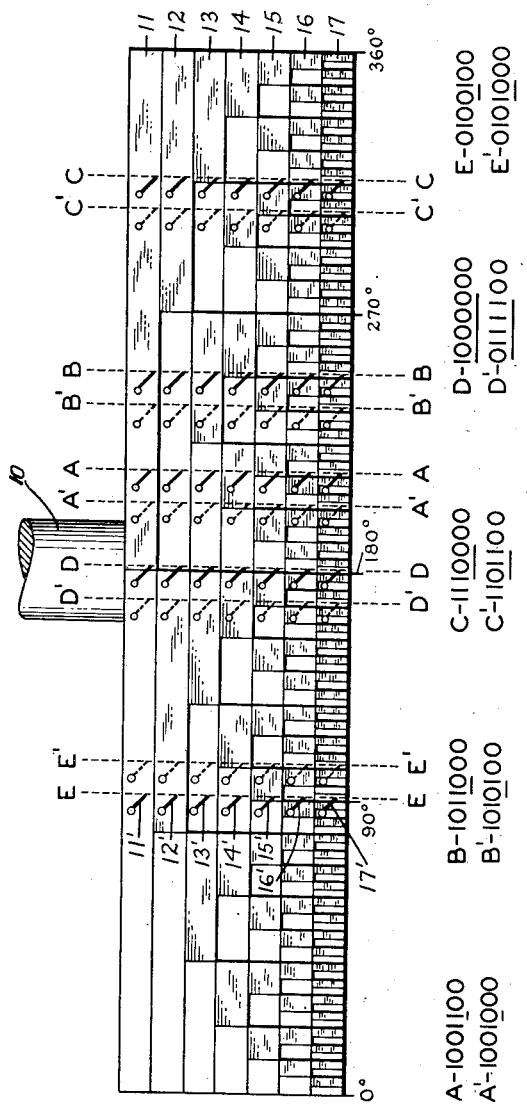
Figure 1 represents, in developed form, a simple form of transducer.

The simple form of transducer unit illustrated in Figure 1 comprises a shaft 10, seven code wheels or disks 11, 12, 13, 14, 15, 16 and 17, and seven brushes 11', 12', 13', 14', 15', 16' and 17'. The shaft 10 may be the shaft to be positioned or may be suitably coupled thereto, as for example, through a gear train. For convenience, the code wheels or disks have been illustrated in developed form so that the illustration of each wheel represents 360° of the peripheral surface thereof. The code wheels are arranged to rotate together and may, if desired, be made as an integral unit for mounting on the shaft 10.

The periphery of code wheel 11 is divided into two equal segments, one electrically conductive and the other electrically non-conductive. As in the case of the other code wheels, the shaded segment is conductive while the plain segment is non-conductive. The code wheel 12 is divided into four equal segments, two of which are conductive and two non-conductive. Code wheels 13, 14, 15, 16 and 17 are divided into eight, sixteen, thirty-two, sixty-four and one hundred twenty-eight equal segments respectively. In each case, alternate segments are conductive and non-conductive.

The brushes 11'–17' are each arranged to wipe the surface of a respective one of code wheels 11–17. The brushes 11'–17' are each shown in 10 different positions. In each position, the brushes are arranged to contact the surface of the corresponding code wheels along one of lines A—A, A'—A', B—B etc. If each brush were connected to one terminal of a source of potential while the conductive segment or segments of the corresponding code wheels were connected to the other terminal thereof, it will be evident that current flow through any particular brush circuit will be an indication that such brush is wiping a conductive segment of its code wheel. Similarly, lack of current flow through any particular brush circuit will be an indication that such brush is wiping a non-conductive segment of its code wheel.

A condition of current flow through a brush circuit may be termed "on" while a condition of lack of current flow may be termed "off." If the brush 11' is "on," it will be evident that it is wiping the code wheel 11 some place between zero° and 180°. However, mere knowledge of the "on" and "off" condition of brush 11' will not locate the brush 11' any closer than 180°. An "off" condition for brush 12' will indicate that this brush is wiping the code wheel 12 some place between zero° and 90° or between 180° and 270°. Similarly, an "on" condition for the brush 12' will indicate contact with the code wheel 12 between 90° and 180° or between 270° and 360°. In order to determine which of the two 90° arcs is being wiped by the brush 12' it is also necessary to examine the condition of the brush 11'. Thus, if the brushes 11' and 12' are both "on" it will be evident that the brushes are wiping the respective code wheels between the 270° positions and the 360° positions. Similarly, if the brush 11' is "off" and the brush 12' is "on" then the wiping must be taking place between the 90° and 180° position.

Similar relationships hold for the code wheels 13, 14, 15, 16, and 17. However, each of these code wheels has double the number of segments of the preceding code wheel. Accordingly, just as a consideration of brush 12' condition doubled the accuracy obtainable by a consideration of brush 11' condition, so will a consideration of the condition of brush 13' double the accuracy of positional determination over that achieved by merely considering brushes 11' and 12'. Since code wheel 17 has 128 segments, the arrangement illustrated in Figure 1 is susceptible of an accuracy of one part in 128. Much greater accuracy may be achieved by using additional code wheels or by providing groups of code wheels coupled to the code wheels of Figure 1 at pre-selected speed ratios. Where greater accuracy of shaft positioning is desired, such additional code group or groups should rotate at higher speeds than that of Figure 1. On the other hand, should positioning over more than 360° of rotation be desired then one or more additional code wheel groups rotating slower than the code wheel group of Figure 1 should be provided.

The simple code wheel construction of Figure 1 is practical for many purposes. However, it will be appreciated that this construction may be modified greatly as illustrated, for example, in some of the figures of my above-mentioned copending patent application. For example, equivalent "on" and "off" operation may be secured by providing cam surfaces on the rotating code wheels and switches arranged to be turned "on" or "off" as rotation passes from one segment to the next. The possible modifications and refinements of code wheel construction are not pertinent to the present invention which is generally applicable to any such modification.

The condition of brushes 11'–17' at any point in the rotation of the code wheels (or rotation of the brush supporting structure when the code wheels are stationary) is an indication in binary digital form of the instantaneous angular disposition of the code group and also of the shaft 10. Thus along the line EE of Figure 1 brush 11' is "off," brush 12' is "on," brush 13' is "off," brush 14' is "off," brush 15' is "on," brush 16' is "off" and brush 17' is "off." In binary digital notation or code, this may be expressed as binary number 0100100 where 0 is "off," and 1 is "on."

The relative angular position of the shaft 10 with respect to the position of the brushes 11'–17' may be indicated by a group of electrical impulses. For example, the impulses may be current "on" and current "off." As an alternative, the "on" may be represented by a current of one frequency and the "off" condition by a current of another frequency. Still another possibility is to have the "on" condition represented by one polarity of direct current and the "off" condition by the other polarity. For convenience in the following discussion, the electrical impulses of "current"—"no current" will be employed.

When it is desired to have the shaft 10 or some shaft coupled thereto assume a desired angular position, a set of binary digital electrical impulses corresponding to this desired position may be provided, as, for example, by means of switches, punched tapes, magnetic tapes, or by rotation of a "transmitting" transducer corresponding to the "receiving" transducer associated with the shaft 10. This pre-selected set of impulses may be compared with the impulses representing instantaneous angular position of the shaft 10. Any mismatch between the two sets of impulses may be used as a control to operate a motor to drive the shaft 10 toward the desired angular position. When the two sets of impulses match, i. e., coincide exactly, the motor will stop and the shaft will be positioned as desired. Suitable comparing and control circuits for effecting these operations are disclosed in my said copending patent application. In addition to the basic operational circuits, there are also disclosed therein a number of refinements in operation which will not be discussed herein, since to do so would unnecessarily complicate the description of the present invention.

In the comparing and control cricuits disclosed in my said copending application, and in the comparing and control circuit to be described hereinafter in connection with Fig. 2, a matched condition of impulses derived (1) from the transducer and (2) supplied to the system from some other source results in stopping the motor which is driving the transducer. In accordance with the invention, the arrival of the code wheel group, i. e., the transducer at the required position for stopping is anticipated by a predetermined interval, and the motor is slowed before arrival of the transducer at its end position requires stopping thereof.

In Fig. 1, motion of the brushes to the right (or motion of the code wheel group toward the left) will be considered to cause changes in the binary digital representation of position in ascending binary code; motion to the left will be considered descending. For example, the binary code of the position EE is 0100100, whereas the line CC represnts a position of 1110000, a higher binary number. When the code wheel segment through which slowdown is to be effective has been selected, the location of the start of the slowdown interval relative to the final stopping position may be ascertained for motion yielding ascending binary codes by subtracting one digit (of a value equal to the selected segment length) from the digital code representing the final position. For descending binaries, the digit should be added. The comparing and control circuit, to achieve slowdown, should thus be capable of binary addition and substraction.

The predetermined interval at which the slowing down is to become effective prior to a stopping position may be selected on the basis of the length of a code wheel segment. It may be any convenient code wheel segment such as, for example, one segment of code wheel 17, or, if a longer interval is desired, one segment of any of the other code wheels. Assuming right-hand brush motion, and assuming line AA to be the final stopping position, and also assuming that slowdown is desired a rotational distance equal to one segment of code wheel 15 before arrival at line AA, the position at which slowdown is to become effective is therefore along the line A'A'. The binary code at AA is 1001100, and at A'A' is 1001000. As will be readily apparent from the tabular notation in Fig. 1, these two binary numbers differ only in the fifth digit. Furthermore, the fifth digit along the line AA is "on." It will be observed that in general when the digit representing the desired interval is "on," it is only necessary to change that digit in the number representing the stopping position to obtain the number representing the slowing motion.

If the position along the line BB is the stopping position, and along the line B'B' the slowing position, the situation is somewhat different. The code along BB is 1011000, and at B'B' 1010100. The digit representing the slowing interval, i. e., the fifth digit, is now "off," and to obtain B'B' not only must the fifth digit be changed, but also the one preceding it. It will be noted that the one preceding it, i. e., the fourth, is "on" and must be changed to "off." If the stopping point is along the line CC (1110000) and the slowing point along the line C'C' (1101100), the fifth and fourth digits are both "off" and the change must be carried to the next preceding digit, i. e., the third. In changing from DD to D'D' (1000000 to 0111100), all the digits except the first are "off," so that all digits to the left of the fifth must therefore be changed. In general, when the digit representing the desired interval is "off," that digit must be changed and the change carried through all digits preceding it which are also "off," up to and including the first digit which is reached that is "on." The foregoing discussion applies to right-hand brush motion in Fig. 1, i. e., ascending binaries. For left-hand brush motion, i. e., descending binaries, the "off" and "on" terms should be reversed. Consider the line EE as the stopping point and the line E'E' as the slowup point. The binary number representing the EE position is 0100100 and the binary number representing E'E' is 0101000. The fact that the fifth digit is "on" now requires change of the preceding digit, whereas with ascending binaries the "off"

condition of the fifth digit requires the change. The same reasoning for other digits as given for ascending binaries applies to descending binaries when the words "on" and "off" are changed. A generalized statement of conditions for determining the binary code of the slowup starting point can be stated as follows:

1. When the digit representing the desired interval is "on" for ascending and "off" for descending binaries, it is only necessary to change that digit in the number representing the stopping point to obtain the number representing the slowing point.

2. When the digit representing the desired interval is "off" for ascending and "on" for descending binaries, that digit must be changed and the change carried through all digits preceding it which are also "off" for ascending and "on" for descending binaries, up to and including the first digit reached which is "on" for ascending and "off" for descending binaries.

Stated in more general terms, the comparing and control circuit must sense achievement of the stopping point code and also achievement of a code indicating the advance of the stopping point code and differing therefrom by a selected binary digit.

A comparing and control circuit for achieving slowdown pursuant to these conditions will now be described in connection with Fig. 2. The circuit of Fig. 2 shows all of the elements necessary for the comparing and control circuit operation with slowdown. However, to simplify the circuit, connections for only two code wheels are shown. Where additional code wheels are used, as will normally be the case, additional circuit elements identical to certain of those shown in Fig. 2 should be added, one set for each additional code wheel. The code wheel, one segment of which represents the largest amount of angular rotation of the controlled shaft, will be termed the most major code wheel, and any code wheel one segment of which represents a smaller proportion of controlled shaft rotation will be termed a minor code wheel. Thus in Fig. 1 the code wheel 11 is the most major code wheel, while the code wheel 17 is the most minor code wheel. The code wheel 13 is more major than is the code wheel 14. In Fig. 2, which corresponds generally to Fig. 7 of my abovementioned copending patent application, positional information is supplied to the circuit by operation of one or both of relays 92T and 93T. Operation of relay 92T corresponds to a binary code with a first digit "on." Operation of relay 93T corresponds to a binary code with a second digit "on." Additional relays can and normally will be provided to correspond to additional binary digits.

Relay 92T is energized when a switch 92S is closed "on." Relay 93T is energized when a switch 93S is closed "on." The energizing circuit for the relay 92T extends from a source of positive potential 50 through a manual switch 51, a conductor 52, the coil of relay 92T, and switch 92S to ground. The coil of relay 93T is similarly connected to the conductor 52. Additional relay coils would be similarly connected.

Figure 2:
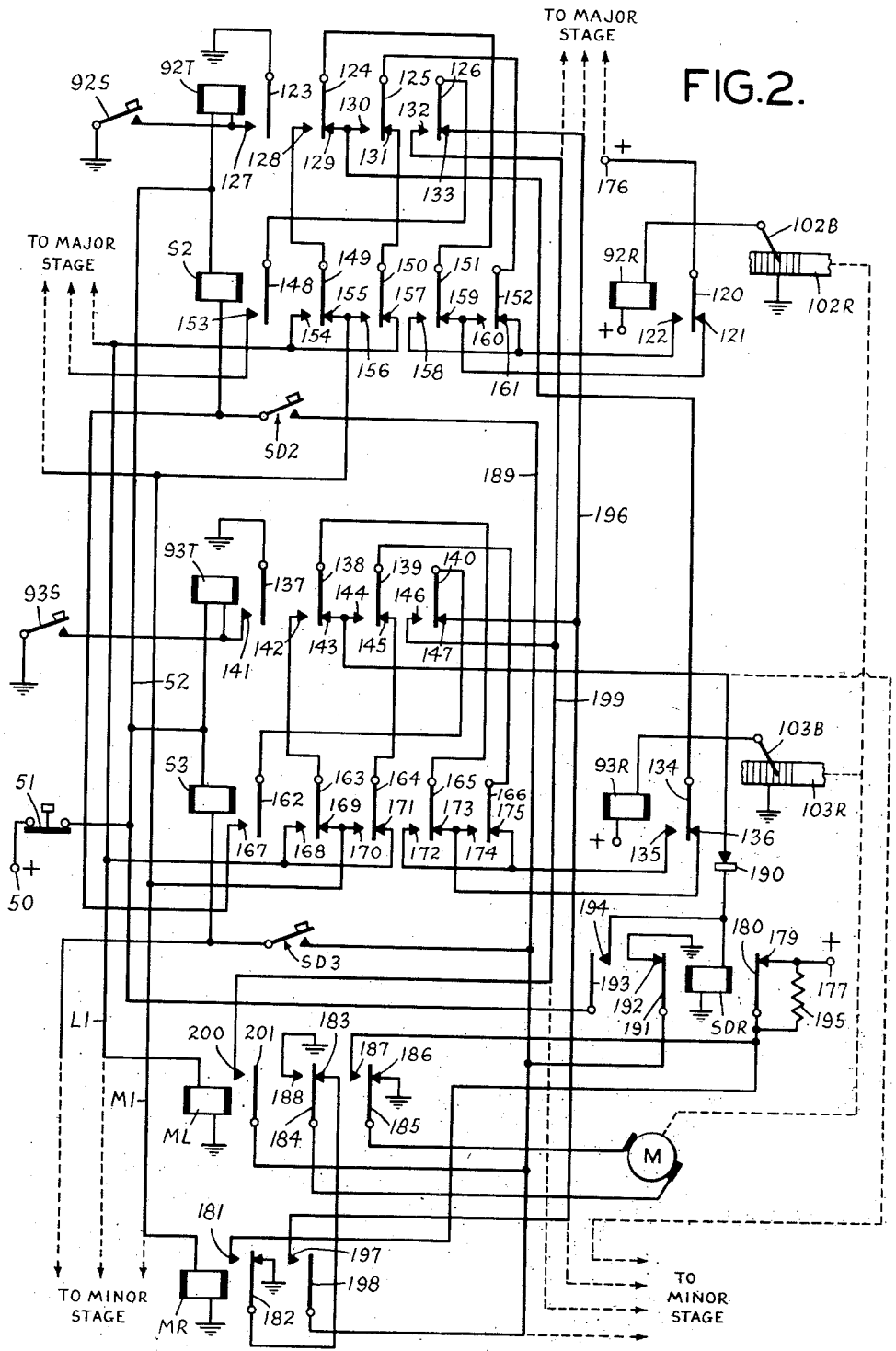
Figure 2 illustrates an electrical circuit, in accordance with the invention, for effecting slow down at a desired interval before stopping.

The reference numerals 102R and 103R refer to code wheels of which only a fragmentary portion is shown in Fig. 2. The code wheel 102R is next major to the code wheel 103R. A brush 102B and a brush 103B are arranged to wipe the code wheels 102R and 103R, respectively. The brush 102B, when wiping a conductive segment of the code wheel 102R, completes an energizing circuit for a relay 92R extending from a source of positive potential through the coil of relay 92R, the brush 102B, and conductive segment of code wheel 102R to ground. Similarly, a circuit may be completed from a source of positive potential through the coil of a relay 93R, the brush 103B, and a conductive segment of code wheel 103R to ground. The relays 92R and 93R will thus be energized for "on" code conditions of the transducer and off for "off" code conditions.

The relays 92R and 92T are associated with the same digit of (1) a code indication of instantaneous transducer position and (2) a code indication of desired transducer position, respectively. Where a mismatch exists, a motor M is energized to cause the transducer to rotate until the mismatch is corrected and a matched condition results.

The relay 92R is provided with an armature 120, a back contact 121, and a front (or make) contact 122. The relay 92T is provided with four armatures, 123, 124, 125 and 126. The armature 123 has a front contact 127; the armature 124 has a front contact 128 and a back contact 129; the armature 125 has a front contact 130 (connected to the contact 129) and a back contact 131; and the armature 126 has a front contact 132 and a back contact 133.

The relay 93R has an armature 134, a front contact 135, and a back contact 136. The relay 93T has four armatures, 137, 138, 139 and 140. The armature 137 has a front contact 141; the armature 138 has a front contact 142 and a back contact 143; the armature 139 has a front contact 144 (connected to the contact 143) and a back contact 145; the armature 140 has a front contact 146 and a back contact 147.

Associated with the relays 92T and 93T are relays S2 and S3, which, when de-energized, do not affect circuit operation but which, when energized, assist in performing the adding or subtracting functions necessary for slowdown. The relay S2 is provided with five armatures, 148, 149, 150, 151 and 152. The armature 148 has a front contact 153; the armature 149 has a front contact 154 and a back contact 155; the armature 150 has a front contact 156 and a back contact 157; the armature 151 has a front contact 158 and a back contact 159; and the armature 152 has a front contact 160 and a back contact 161. Similarly, the relay S3 is provided with five armatures, 162, 163, 164, 165 and 166. The armature 162 has a front contact 167; the armature 163 has a front contact 168 and a back contact 169; the armature 164 has a front contact 170 and a back contact 171; the armature 165 has a front contact 172 and a back contact 173; and the armature 166 has a front contact 174 and a back contact 175.

Assuming a mismatched condition in which relay 92T is energized and relay 92R is de-energized, and further assuming that this type of mismatch should properly have motor operation to the right to arrive most speedily at a matched condition, the circuit operation for correcting the mismatch proceeds as follows: positive potential from a source 176 is supplied to the coil of a relay MR through a circuit extending from the source 176 through armature 120 and back contact 121, back contact 159 and armature 151, armature 124 and front contact 128, armature 149 and back contact 155, and a conductor M1 to the coil of relay MR. With relay MR energized and a relay ML de-energized, the motor M is energized, in a sense to correct the mismatch, through a circuit extending from a source of positive potential 177, a back contact 179, an armature 180 of a relay SDR, a front contact 181 and an armature 182 of relay MR, a back contact 183 and an armature 184 of relay ML, the coil of motor M, an armature 185 and a back contact 186 of relay ML, to ground. The motor M will thus rotate until the brush 102B reaches a conductive segment of the code wheel 102R, at which time the relay 92R will become energized. Since the conditions of the relays 92R and 92T will now be matched, control will pass to the next code wheel 103R. In so far as the relays 92T and 92R are concerned, the motor M will no longer be energized. However, if the conditions of the relays 93T and 93R are mismatched, the motor M will still continue to rotate.

Assuming relay 93T to be energized and relay 93R to be de-energized, which will be the condition normally occurring for a change from a conductive to a non-conductive segment of the next most major code wheel as outlined above, the relay MR will continue to be energized to operate the motor M in the same direction. The former energizing circuit for the relay MR will be opened at contact 121 upon operation of armature 120 to its front contact 122. The continued energizing circuit extends from the terminal 176 through the armature 120 and front contact 122, back contact 161 and armature 152, armature 125 and front contact 130, armature 134 and back contact 136, back contact 173 and armature 165, armature 138 and front contact 142, armature 163 and back contact 169, conductor M1 and the coil of relay MR to ground. Motor M will thus be energized in exactly the same way as described previously. When relay 93R picks up, signaling a matched condition between the code wheel 103R and the switch 93S, relay MR will drop out and motor M will stop.

If the relays 93T and 93R had been in matched condition at the time relays 92T and 92R became matched, the motor would then have stopped, since there would be no completed energizing circuit for the relay MR.

Assuming a mismatched condition in which the relay 92T is de-energized and the relay 92R is energized, motor M will be energized in the opposite direction, which may arbitrarily be stated as the left direction, to correct the mismatch. For energizing of the motor M in the left direction, the relay ML should be picked up through a circuit extending from the terminal 176, the armature 120 and front contact 122, the back contact 161 and armature 152, armature 125 and back contact 131, armature 159 and back contact 157, conductor L1 and the coil of relay ML to ground. The motor M will now be energized in the reverse direction through a circuit extending from the positive terminal 177 through back contact 179 and armature 180, a front contact 187 and armature 185 of relay ML, the coil of motor M, armature 184 and a front contact 188 of relay ML to ground.

A matched condition between the switch 92S and the major code wheel 102R will be achieved when the brush 102B begins to wipe a non-conductive segment of the code wheel 102R, thus dropping out the relay 92R. At this time the switch 93S and the code wheel 103R will be either matched or mismatched with the switch 93S closed and the brush 103B wiping a conductive segment of the code wheel 103R. If these elements are matched, the motor M will stop. If they are mismatched, the relay ML will be retained in its energized state and the motor M will continue to rotate toward the left. The energizing circuit for relay ML under these conditions extends from the terminal 176 through armature 120 and back contact 121, back contact 159 and armature 151, armature 124 and back contact 129, armature 134 and front contact 135, back contact 175 and armature 166, armature 139 and back contact 145, armature 164 and back contact 171, conductor L1 and the coil of relay ML to ground. Relay ML will drop out when a matched condition is reached and the motor M will stop.

Should additional code wheels be provided, as will normally be the case, each additional code wheel will cause the addition to the control circuit of three relays, one corresponding to 92T and 93T, one corresponding to S2 and S3, and one corresponding to 92R and 93R. The coil of the relay corresponding to 93T will have one of its terminals connected to ground through a switch corresponding to 92S and 93S, and the other terminal connected to the conductor 52 to provide operating potential. One terminal of the coil of the relay corresponding to S2 and S3 would be connected through a switch corresponding to SD2 and SD3 to a conductor 189, whose function will be described hereinafter. The relay corresponding to 92R and 93R will have one terminal of its coil connected to a source of positive potential and the other terminal connected to the corresponding code wheel brush, as in the case of relays 92R and 93R. The armatures, contacts and connections thereof for such additional relays would be the same as for the relays 93T, 93R and S3, respectively. These are shown generally by dotted lines and arrows in the drawing. It will be recalled that the conductor leading from the contacts 129 and 130 of relay 92T serves to pass the control from code wheel 102R to code wheel 103R. The conductor joining the corresponding contacts 143 and 144 would, in the case of additional code wheels, lead to the armature of the relay corresponding to 93R. The rectifier 190 and relay SDR may be connected to the corresponding contacts of the most minor T relay, or, if desired, to such contact of any T relay. However, slowdown interval selection will not be possible with T relays more minor than the one to which the relay SDR is connected.

In order to achieve slowdown before arriving at the stopping point, the comparison of certain pairs of digits should be reversed as indicated hereinabove. The effect is to add or subtract a selected binary digit from the binary code combination constituting the desired position of the transducer and to sense the generation of this altered combination by the transducer. Upon such sensing, a motor slowdown circuit is energized. In order to effect this in the circuit of Fig. 2, an additional relay is introduced into each comparison pair, its function being, when operated, to reverse the operation of the T relay, but, when not operated, to have the function of the T relay remain normal. These added relays are S2 and S3.

Each S relay is provided with an SD switch (SD2 and SD3) which, when closed, will energize the associated S relay and will determine the slowdown interval as the binary digit corresponding to the associated S and T relays. Thus, if switch SD2 is closed, the slowdown interval will be equal to the length of a segment of the code wheel 102R. If switch SD2 is open and switch SD3 is closed, the slowdown interval will be one-half as much, or, in other words, it will be equal to the length of a segment of the code wheel 103R. The switch energizing circuit for relay S2 extends from the terminal 50 through the switch 51, conductor 52, the coil of relay S2, switch SD2, conductor 189, an armature 191 and back contact 192 of relay SDR to ground. The switch energizing circuit for relay S3 extends from the terminal 50 through switch 51, conductor 52, the coil of relay S3, switch SD3, conductor 189, armature 191, and back contact 192 to ground.

In order to achieve slowdown at the proper time, the circuit must sense the generation by the transducer of a binary digital code which differs by the addition or subtraction (for descending and ascending binaries, respectively) of the selected binary digit. In other words, if the binary code for the stopping position is 1000000 and the stopping interval is equivalent to the fifth binary digit, the binary code for the position at which slowdown should occur is 0111100. These two binary numbers differ by the subtraction of one fifth digit from the former. For descending binaries, the slowdown should occur with one selected digit added to the stopping position code. Thus, if the binary digital code for the stopping position on descending binaries is 0100100 and slowdown is to be effected one fifth digit interval away, the binary code to be sensed for the start of slowdown is 0101000, i. e., an addition of one fifth binary digit. It will be recalled that in general when the digit representing the desired interval is "off" for ascending and "on" for descending binaries, that digit must be changed and the change carried through all digits preceding it which are also "off" for ascending and "on" for descending binaries up to and including the first digit which is reached that is "on" for ascending and "off" for descending binaries.

Thus, if switch SD3 is closed, indicating that the slowdown interval is to be one segment of the code wheel 103R, and the motion of brushes is to the right in Fig. 1, the situation is one of ascending binaries. Under these circumstances, if the relay 92T is "off" and the relay 93T is "on," reversal is only necessary in the 93 stage, and this will be effected by operation of relay S3. If, on the other hand, the relay 93T is "off" and the relay 92T is "on," then reversal is required in both 92 and 93 stages, but not in any stages more major to the 92, if such be provided. If both the 92T and 93T relays are "off," then reversal of both stages is required and also reversal of all more major stages up to and including the one in which the 92 relay is "on." The situation is exactly the reverse for descending binaries. For example, if the 93 relay is "off," only relay 93T need be reversed. If relay 93T is "on," then it needs to be reversed and all T relays more major thereto up to and including the first digit reached which is "off" must be reversed.

Circuit operation with switch SD3 closed will now be described. Assuming a mismatched condition in which relay 93T is "on" and relay 93R is "off," and assuming ascending binaries, i. e., the relay MR energized to cause motor operation to the right by virtue of efforts of the preceding stages to effect matching, the effect of operation of relay S3 will be to reverse the indication of relay 93T as soon as control passes to the 93 stage. The relay SDR will be energized as soon as control passes to the 93 stage, provided that all stages more minor than the 93 stage (if any) are in matched condition. Energization of relay SDR will be delayed until matched conditions in such more minor stages are reached, although relay S3 has been operated. Passage of control to the 93 stage is signaled by application of a positive potential to the armature 134. Where the 93 stage is the most minor stage, this potential will not be applied immediately to the relay MR because the relay SDR must operate first in order to destroy the "false" matched condition which exists because of operation of relay S3. The energizing circuit for relay SDR, under these circumstances, extends from the armature 134 through back contact 136, front contact 174 and armature 166, armature 139 and front contact 144, rectifier 190, and the coil of relay SDR to ground. The rectifier 190 is provided to prevent positive potential from extending from the lower portions of the circuit to the upper portions of the circuit, which might occur when relay SDR is "on" and locked in. Relay SDR is locked in through its armature 193 and front contact 194, which are connected through the conductor 52 and the switch 51 to the terminal 50. When relay SDR is operated, relay S3 will drop out because of the opening of its energizing circuit at armature 191 and back contact 192. As soon as this has occurred, the potential appearing at armature 134 may now be applied to relay MR through a circuit including back contact 136, back contact 173 and armature 165, armature 138 and front contact 142, armature 163 and back contact 169, and the coil of relay MR to ground. It will be appreciated that the energization of relay SDR and the subsequent dropping out of relay S3 will occur almost simultaneously, so that the relay MR would not have time to drop out and forward motion of the motor will not be prevented. However, when relay SDR picks up, a resistor 195 is inserted in the power circuit for the motor M by the removal of a short circuit thereacross provided by the armature 180 and back contact 179 of relay SDR. The circuit will now continue to a matched condition at a predetermined reduced speed. Upon achievement of a matched condition, the motor M will stop.

If stages more minor than the 93 stage were provided, relay SDR might not be picked up at exactly the same time that control passes to the 93 stage because all more minor stages would have to be matched before relay SDR can pick up. These will be illustrated by considering a situation in which switch SD2 is closed and switch SD3 is open. Assume relays 92T and 93T to be "on" and relays 92R and 93R to be "off," and also assume ascending binaries so that relay MR is picked up by stages more major than the 92 stage. Control will pass to the 92 stage from a more major stage by application of potential to the armature 120. Since relay S2 is operated (by the closing of SD2), relay MR cannot continue to be operated through the circuit previously described. Instead, it is operated through a circuit extending from armature 120, through back contact 121, front contact 160 and armature 152, armature 125 and front contact 130, armature 134 and back contact 136, back contact 173 and armature 165 armature 138 and front contact 142, armature 163 and back contact 169, conductor M1, and the coil of relay MR to ground, or, in other words, through the next minor stage. As soon as relay 93R picks up so that a matched condition in the 93 stage exists, this energizing circuit for relay MR will be broken at the back contact 136 of relay 93R and relay SDR will pick up by a circuit extending from the armature 134 through front contact 135, back contact 175 and armature 166, armature 139 and front contact 144, rectifier 190, and the coil of relay SDR to ground. This will cause slowdown to take effect, as described before, and will also cause relay S2 to drop out by the opening of contact 192 and armature 191. The energizing circuit for relay MR will now extend from the armature 120 through back contact 121, back contact 159 and armature 151, armature 124 and front contact 128, armature 149 and back contact 155, conductor M1, and the coil of relay MR to ground. This indicates that control of the MR relay passes back up to the 92 stage. Achievement of a matched condition will now continue in a normal manner except that the motor M will operate at a reduced speed until it stops. Thus relay MR will continue to be energized through the circuit just described until relay 92R picks up, at which time control potential will pass to the armature 134 and relay MR will be held up in the 93 stage until relay 93R picks up, indicating a match in this stage. It should be recalled that relay 93R will have dropped out at the same time that relay 92R picked up upon matching of the 92 stage.

As explained previously, when the digit representing the desired interval is "on" for ascending and "off" for descending binaries, it is only necessary to change that digit in the code representing the stopping point to obtain the code representing the slowing point, or, in other words, to operate the S relay of the associated comparison group. When the digit representing the desired interval is "off" for ascending and "on" for descending binaries, that digit must be changed and the change carried through all digits preceding it which are also "off" for ascending and "on" for descending binaries up to and including the first digit reached that is "on" for ascending and "off" for descending binaries. It will be observed that the first situation is a special condition of the second. In order to effect the digit change of comparison groups more major than the interval selecting digit, the S relays of such major comparison groups must be operated. For ascending binaries, the relay MR is energized, and for descending binaries, the relay ML is energized. Operation of relay MR (or ML for descending) will energize all S relays whose associated T relays are "off" (or "on" for descending), up to and including the first T relay reached which is "on" ("off" for descending). This is done by applying ground potential to conductor 196 with relay MR energized and relay SDR de-energized, and applying ground potential to conductor 199 when relay ML is energized and relay SDR de-energized. The circuits for applying ground potential to these conductors are as follows: from ground through back contact 192 and armature 191, conductor 189, armature 198 and front contact 197 to conductor 196; from ground through back contact 192, armature 191, conductor 189, armature 201, front contact 200 to conductor 199. If switch SD3 is closed, relay S3 picks up as described, and relay S2 picks up by receiving a ground from either front contact 146 or back contact 147 of relay 93T. Once relay S2 picks up, the next most major relay would be picked up in the same way provided its associated T relay were in the proper condition. A relay more minor than S3 would be picked up by being connected to the lower terminal of the coil of relay S3, as indicated in dotted lines.

Once a complete match is achieved, the circuit may be reset for matching to a new binary code by opening switch 51.

If for any reason it should be desired to have the motor speed increase instead of decrease when the transducer is a given digital interval away from a particular position, e. g., the final stopping position, the contact 179 could be made a front contact so that resistor 195 will normally be in the motor circuit but will be shorted out upon energization of relay SDR. Should a greater number of motor speeds be desired, one or more additional SDR relays could be provided. These would preferably be arranged to lock-in in sequence.

While the invention has been described in a particular embodiment thereof, various modifications thereof will occur to those skilled in the art without departing from the spirit and scope of the invention as set forth in the appended claims. For example, the circuit arrangement of Fig. 2 can be considerably modified and still achieve the requirement of adding or substracting binary digits to permit sensing of a code different from the stopping point code by a predetermined binary digital amount so that slowdown may be initiated at the desired time.

What is claimed is:

1. A data conversion system, comprising a rotatable element, a source of a first plurality of electrical impulses in unique combinations each representative, in binary digital impulse code, of a desired discrete angular disposition of the rotatable element, transducer means associated with said rotatable element for generating a second and like plurality of electrical impulses in unique combinations each representative, in like binary digital impulse code, of a discrete instantaneous angular disposition of said rotatable element, motor means for rotating said rotatable element at a predetermined speed, means for comparing sequentially and progressively the impulses constituting the digits of said codes, means operative when the compared impulses differ to operate said motor means in a sense to cause the impulse code generated by said transducer means to match the impulse code from said source, and means responsive to generation by said transducer of an impulse code differing from the impulse code from said source by a selected binary digital amount to cause said motor means to rotate said rotatable element at a sped lower than said predetermined speed.

2. A data conversion system, comprising a rotatable element, a source of a first plurality of electrical impulses in unique combinations each representative, in binary digital impulse code, of a desired discrete angular disposition of the rotatable element, transducer means associated with said rotatable element for generating a second and like plurality of electrical impulses in unique combinations each representative, in like binary digital impulse code, of a discrete instantaneous angular disposition of said rotatable element, motor means for rotating said rotatable element at a predetermined speed, means for comparing sequentially and progressively the impulses constituing the digits of said codes, means operative when the compared impulses differ to operate said motor means in a sense to cause the impulse code generated by said transducer means to match the impulse code from said source, and means responsive to generation by said transducer of an impulse code differing from the impulse code from said source by a selected binary digit to cause said motor means to rotate said rotatable element at a speed lower than said predetermined speed.

3. A data conversion system, comprising a rotatable element, a source of a first plurality of electrical impulses in unique combinations each representative, in binary digital impulse code, of a desired discrete angular disposition of the rotatable element, transducer means associated with said rotatable element for generating a second and like plurality of electrical impulses in unique combinations each representative, in like binary digital impulse code, of a discrete instantaneous angular disposition of said rotatable element, motor means for rotating said rotatable element at a predetermined speed, means for comparing sequentially and progressively the impulses constituting the digits of said codes, means operative when the compared impulses differ to operate said motor means in a sense to cause the impulse code generated by said transducer means to match the impulse code from said source and to stop said motor means when the impulse code generated by said transducer means matches the impulse code from said source, and means responsive to generation by said transducer of an impulse code differing from the impulse code from said source by a selected binary digit to cause said motor means to rotate said rotatable element at a speed lower than said predetermined speed.

4. A data conversion system, comprising a rotatable element, a source of a first plurality of electrical impulses in unique combinations each representative, in binary digital impulse code, of a desired discrete angular disposition of the rotatable element, transducer means associated with said rotatable element for generating a second and like plurality of electrical impulses in unique combinations each representative, in like binary digital impulse code, of a discrete instantaneous angular disposition of said rotatable element, motor means for rotating said rotatable element at a predetermined speed, a plurality of first switching mechanisms each associated with a respective digit of said first plurality of impulses, a plurality of second switching mechanisms each associated with a respective digit of said second plurality of impulses, a direction preference switching mechanism coupled to said motor means for selectively energizing said motor means in either direction, first circuit means intercoupling corresponding ones of said first and second switching mechanisms to provide comparison and control stages each associated with a respective binary digit, second circuit means intercoupling each of said stages with the succeeding stage and with said direction preference mechanism, the mechanisms of said stages being responsive to a mismatch of the associated impulses to apply a potential to said direction preference mechanism in a sense to cause the latter to operate said motor means in a sense to cause the associated impulse generated by the transducer means to match the associated impulse suppplied from said source, control of said direction preference mechanism passing sequentially from stage to stage as each stage senses a matched condition of the associated impulses, and means associated with a predetermined one of said stages and being operative when control is passed to its associated stage to cause said motor means to operate at a speed lower than said predetermined speed for an interval, just prior to complete matching of the two groups of impulses, equal to the value of the binary digit associated with said predetermined stage.

5. A data conversion system, comprising a rotatable element, a source of a first plurality of electrical impulses in unique combinations each representative, in binary digital impulse code, of a desired discrete angular disposition of the rotatable element, transducer means associated with said rotatable element for generating a second and like plurality of electrical impulses in unique combinations each representative, in like binary digital impulse code, of a discrete instantaneous angular disposition of said rotatable element, motor means for rotating said rotatable element at a predetermined speed, a plurality of first switching mechanisms each associated with a respective digit of said first plurality of impulses, a plurality of second switching mechanisms each associated with a respective digit of said second plurality of impulses, a direction preference switching mechanism coupled to said motor means for selectively energizing said motor means in either direction, first circuit means intercoupling corresponding ones of said first and second switching mechanisms to provide comparison and control stages each associated with a respective binary digit, second circuit means intercoupling each of said stages with the succeeding stage and with said direction preference mechanism, the mechanisms of said stages being responsive to a mismatch of the associated impulses to apply a potential to said direction preference mechanism in a sense to cause the latter to operate said motor means in a sense to cause the associated impulse generated by the transducer means to match the associated impulse supplied from said source, control of said direction preference mechanism passing sequentially from stage to stage as each stage senses a matched condition of the associated impulses, and speed changing means associated with a predetermined one of said stages and being operative when control is passed to its associated stage to cause said motor means to operate at a speed different than said predetermined speed for an interval, just prior to complete matching of the two groups of impulses, equal to the value of the binary digit associated with said predetermined stage, said speed changing means including circuit elements coupled to said stages and arranged temporarily to reverse the matching sense of selected stages so that the speed changing means operates on said motor means when the binary digital code generated by said transducer as it seeks the code matching position differs from the binary digital code provided by said source by said binary digit associated with said predetermined stage.

6. A data conversion system, comprising a rotatable element, a source of a first plurality of electrical impulses in unique combinations each representative, in binary digital impulse code, of a desired discrete angular disposition of the rotatable element, transducer means associated with said rotatable element for generating a second and like plurality of electrical impulses in unique combinations each representative, in like binary digital impulse code, of a discrete instantaneous angular disposition of said rotatable element, motor means for rotating said rotatable element at a predetermined speed, a plurality of first switching mechanisms each associated with a respective digit of said first plurality of impulses, a plurality of second switching mechanisms each associated with a respective digit of said second plurality of impulses, a direction preference switching mechanism coupled to said motor means for selectively energizing said motor means in either direction, first circuit means intercoupling corresponding ones of said first and second switching mechanisms to provide comparison and control stages each associated with a respective binary digit, second circuit means intercoupling each of said stages with the succeeding stage and with said direction preference mechanism, the mechanisms of said stages being responsive to a mismatch of the associated impulses to apply a potential to said direction preference mechanism in a sense to cause the latter to operate said motor means in a sense to cause the associated impulse generated by the transducer means to match the associated impulse supplied from said source, control of said direction preference mechanism passing sequentially from stage to stage as each stage senses a matched condition of the associated impulses, said motor means being stopped when complete matching of said codes occurs, and speed changing means associated with a predetermined one of said stages and being operative when control is passed to its assocaited state to cause said motor means to operate at a speed lower than said predetermined speed for an interval, just prior to complete matching of the two groups of impulses, equal to the value of the binary digit associated with said predetermined stage, said speed changing means including a relay arranged, when energized, to effect the lower speed motor means operation and a plurality of switching mechanisms, one for each of said stages, said last mentioned switching mechanisms being arranged to operate on selected ones of said stages to reverse temporarily the matching sense thereof thereby to provide an energizing potential for said relay when the binary digital code generated by said transducer differs from the binary digital code provided by said source by said binary digit associated with said predetermined stage.

7. A data conversion system, comprising a rotatable element, a source of a first plurality of electrical impulses in unique combinations each representative, in binary digital impulse code, of a desired discrete angular disposition of the rotatable element, transducer means associated with said rotatable element for generating a second and like plurality of electrical impulses in unique combinations each representative, in like binary digital impulse code, of a discrete instantaneous angular disposition of said rotatable element, motor means for rotating said rotatable element at a predetermined speed, means for comparing sequentially and progressively the impulses constituting the digits of said codes, means operative when the compared impulses differ to operate said motor means in a sense to cause the impulse code generated by said transducer means to match the impulse code from said source, and means responsive to generation by said transducer of an impulse code differing from the impulse code from said source by a selected binary digital amount to cause said motor means to rotate said rotatable element at a speed different than said predetermined speed.

References Cited in the file of this patent

UNITED STATES PATENTS 2,537,427    Seid et al. _____ Jan. 9, 1951